W. F. POTTS.
PIPE COUPLING.
APPLICATION FILED JUNE 17, 1914.
1,147,889.
Patented July 27, 1915.
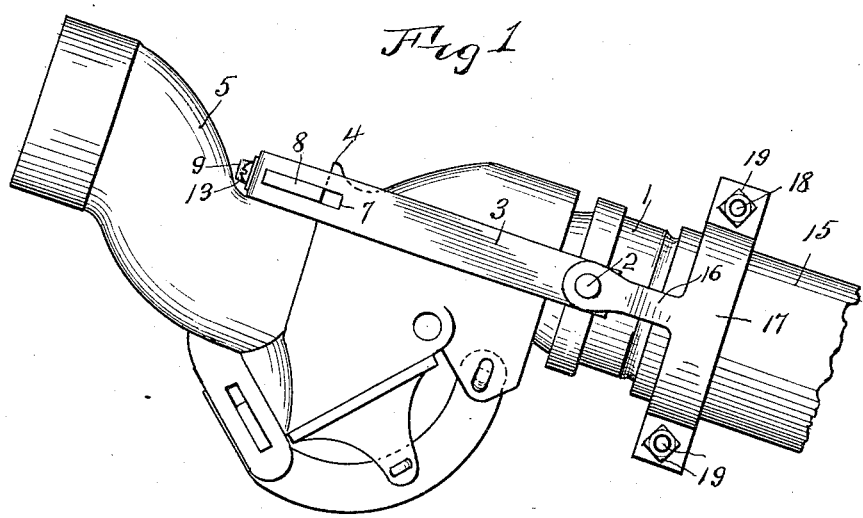
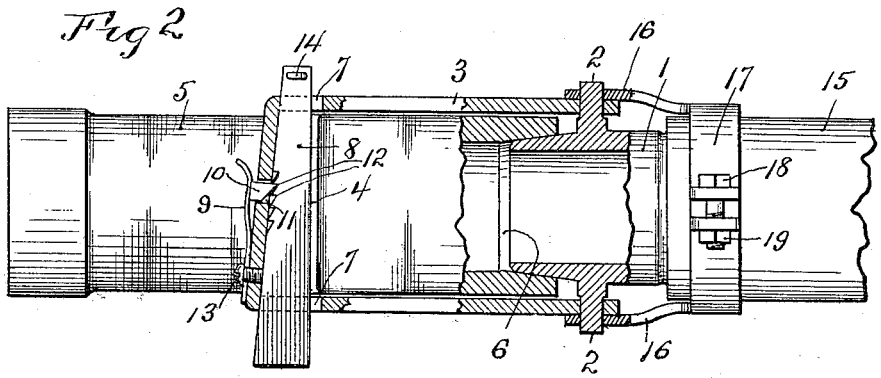
WITNESSES:
R. Hamilton
E. B. House.
INVENTOR.
William F. Potts
BY Warren A. House
His ATTORNEY.

UNITED STATES PATENT OFFICE.

WILLIAM F. POTTS, OF KANSAS CITY, MISSOURI.

PIPE-COUPLING.

1,147,889.

Specification of Letters Patent.

Patented July 27, 1915.

Application filed June 17, 1914. Serial No. 845,613.

*To all whom it may concern:*

Be it known that I, WILLIAM F. POTTS, a citizen of the United States, residing at Kansas City, in the county of Jackson and State of Missouri, have invented a certain new and useful Improvement in Pipe-Couplings, of which the following is a specification.

My invention relates to improvements in pipe couplings.

It is particularly adapted for use in connecting the water supply pipe of a locomotive boiler with the hose leading from the locomotive tender.

One of the objects of my invention is to provide a pipe coupling, which is simple in construction, may be readily operated, which is efficient in operation, and in which the pipe sections are not liable to be separated from each other by hard jolting or rough usage.

The novel features of my invention are hereinafter fully described and claimed.

In the accompanying drawing which illustrates the preferred embodiment of my invention, Figure 1 is a side elevation showing my improved pipe coupling in operative position. Fig. 2 is a top view of the same having a portion broken away.

Similar reference characters designate similar parts in the different views.

1 designates one tubular member of the pipe coupling provided with two oppositely disposed trunnions 2 to which are respectively pivoted the arms of a U-shaped connecting member 3, which is adapted to be swung to the operative position shown in the drawing, in which its transverse portion is disposed at the left of a peripheral abutment comprising a transverse shoulder 4 provided on the other pipe coupling member comprising a tube 5, which at its right end, as viewed in Fig. 2, is provided with a conical seat 6, which is adapted to have fitted thereto the adjacent externally conical end of the tubular member 1.

The arms of the connecting member 3 are respectively provided with oppositely disposed longitudinal slots 7, which are adapted to receive a locking wedge 8, which is adapted, in the operative position shown in the drawing, to have its opposite longitudinal edges forced against the abutment 4 and the inside of the transverse portion of the connecting member 3, said inside being, preferably, disposed slightly oblique to the arms of the connecting member.

For releasably holding the wedge 8 in the operative position, shown in the drawing, the outer side of the transverse portion of the connecting member 3 has secured to it a spring pawl 9 provided with a tooth 10 which extends through a hole 11 in said transverse portion and is adapted to engage with one of a longitudinal row of teeth 12, which are provided in the adjacent longitudinal edge of the wedge 8. A screw 13 secures the pawl 9 to the connecting member 3. A cotter pin 14 may be extended through an opening provided through the small end of the wedge 8 at the outer side of the adjacent arm of the member 3, for the purpose of preventing accidental attachment of the wedge from said connecting member, in case that the pawl 9 becomes broken or accidentally disengaged from the teeth 12.

15 designates a piece of rubber hose, which is clamped to the periphery of the tubular member 1 by means of two clamping members 16 which are respectively pivoted to the trunnions 2 and which are respectively provided with transverse arcuate portions 17 provided with flat ends through which extend two bolts 18, each provided with a nut 19, and which respectively connect the adjacent ends of said clamping members. The arcuate portions 17 respectively embrace opposite sides of the hose 15 to which they are clamped by the bolts 18 and nuts 19.

In operating my invention, the clamping members 16 having been secured to the hose 15, the conical end of the member 1 is inserted in the conical end of the member 5, after which the U-shaped member 3 is swung over the abutment 4 to the position shown in the drawing, after which the wedge 8 is forced through the slots 7 so as to tightly bear against the abutment 4 and the inner side of the transverse portion of the connecting member 3. In this position, the tooth 10 of the pawl 9 will engage with one of the ratchet teeth 12, thus holding the wedge in the operative position. The cotter pin 14 is then inserted through the wedge in a hole provided therefor, after which its arms are spread apart in the usual manner to retain it in its proper position. To uncouple the members 1 and 5, the cotter pin 14 is first pulled from the wedge 8, after which the pawl 9 is withdrawn from engagement with the teeth 12, when the wedge 8 can be withdrawn and the connecting member 3 swung so as to clear the abutment 4, upon which the tubular members 1 and 5 may be withdrawn, one from the other.

I do not limit my invention to the structure shown and described, as modifications, within the scope of the appended claims, may be made without departing from the spirit of my invention.

Having thus described my invention, what I claim and desire to secure by Letters Patent, is:—

1. A pipe coupling comprising two tubular members, one having an abutment, a connecting member pivoted to the other tubular member, a wedge adapted for insertion between the connecting member and said abutment, and releasable means for locking the wedge in the operative position.

2. A pipe coupling comprising two tubular members, one having an abutment, a connecting member pivoted to the other tubular member, a wedge adapted for insertion between the connecting member and said abutment, and a pawl having means for engaging the wedge to hold it in the operative position.

3. A pipe coupling comprising two tubular members, one having an abutment, a connecting member pivoted to the other tubular member, a wedge adapted for insertion between the connecting member and said abutment and provided with ratchet teeth, and a pawl adapted to engage said teeth for holding the wedge in the operative position.

4. A pipe coupling comprising two tubular members, one having an abutment, a connecting member pivoted to the other tubular member, a wedge adapted for insertion between the connecting member and said abutment, and a pawl carried by said connecting member and having means for engaging the wedge to hold it in the operative position.

5. A pipe coupling comprising two tubular members, one having an abutment, a connecting member pivoted to the other tubular member, a wedge adapted for insertion between the connecting member and said abutment and provided with ratchet teeth, and a pawl carried by said connecting member and adapted to engage said teeth to hold the wedge in the operative position.

6. A pipe coupling comprising two tubular members, one having an abutment and the other having oppositely disposed trunnions, a U-shaped connecting member having its arms respectively pivoted to said trunnions, a wedge adapted for insertion between the said connecting member and said abutment and having ratchet teeth, and a pawl carried by said connecting member and adapted to engage said teeth to hold the wedge in the operative position.

7. A pipe coupling comprising two tubular members, one having an abutment and the other having oppositely disposed trunnions, a U-shaped connecting member having its arms respectively pivoted to said trunnion, a wedge adapted for insertion between said connecting member and said abutment and having ratchet teeth, and a spring pawl carried by said connecting member and adapted to engage said teeth to hold the wedge in the operative position.

In testimony whereof I have signed my name to this specification in presence of two subscribing witnesses.

WILLIAM F. POTTS.

Witnesses:
J. C. IRWIN,
WARREN D. HOUSE.

Copies of this patent may be obtained for five cents each, by addressing the "Commissioner of Patents, Washington, D. C."